United States Patent [19]

Nakakura et al.

[11] Patent Number: 5,543,189
[45] Date of Patent: Aug. 6, 1996

[54] RESIN COMPOSITIONS, PRODUCTION PROCESS THEREOF, AND PRODUCTS USING THE RESIN COMPOSITIONS

[75] Inventors: Yasushi Nakakura, Tokyo; Hideki Tanaka, Kudamatu; Akira Sano; Akio Mogi, both of Chiba-ken; Matsuhiro Miyamoto; Kazunari Suzuki, both of Sakura, all of Japan

[73] Assignees: Tokuyama Corporation, Yamaguchi-ken; Fujikura, Ltd., Tokyo, both of Japan

[21] Appl. No.: 471,232

[22] Filed: Jun. 6, 1995

Related U.S. Application Data

[62] Division of Ser. No. 117,701, Sep. 8, 1993, abandoned.

[30]    Foreign Application Priority Data

Sep. 8, 1992 [JP] Japan .................................... 4-264162
Sep. 10, 1992 [JP] Japan .................................... 4-242331

[51] Int. Cl.⁶ ........................................................ B32B 1/08
[52] U.S. Cl. ........................................ 428/36.8; 385/147
[58] Field of Search ................................................ 428/36.8

[56] References Cited

U.S. PATENT DOCUMENTS

| | | | |
|---|---|---|---|
| 4,292,222 | 9/1981 | Grigo et al. | 260/29.1 SB |
| 4,535,106 | 8/1985 | Abolins et al. | 524/151 |
| 4,588,775 | 5/1986 | McCullough, Jr. | 525/88 |
| 5,017,635 | 5/1991 | Senuma et al. | 525/288 |
| 5,169,900 | 12/1992 | Gudelis | 525/106 |
| 5,392,374 | 2/1995 | Gorian et al. | 385/100 |

FOREIGN PATENT DOCUMENTS

| | | |
|---|---|---|
| 0042534 | 12/1981 | European Pat. Off. . |
| 0260004 | 3/1988 | European Pat. Off. . |
| 0404011 | 12/1990 | European Pat. Off. . |
| 0404010 | 12/1990 | European Pat. Off. . |
| 56-109401 | 8/1981 | Japan . |
| 1-065147 | 3/1989 | Japan . |
| 1008218 | 3/1983 | U.S.S.R. . |

*Primary Examiner*—Mark D. Sweet
*Attorney, Agent, or Firm*—Wenderoth, Lind & Ponack

[57] ABSTRACT

A resin composition comprises 100 parts by weight of an ethylene-base resin comprising at least 2 wt. % of linear low-density polyethylene and 0.1–30 parts by weight of an organopolysiloxane having an average molecular weight of at least 100,000. The resin composition can be produced by melting and kneading the organopolysiloxane together with the linear low-density polyethylene and then melting and kneading the resulting polymer blend together with the ethylene-base resin other than the linear low-density polyethylene. The resin composition may additionally comprise 0.1–100 parts by weight of a propylene-base resin. In the latter resin composition, the organopolysiloxane is contained in an amount of 0.1–30 parts by weight per 100 parts by weight of the sum of the ethylene-base resin and the propylene-base resin. The latter resin composition can be produced by melting and kneading the organopolysiloxane together with the propylene-base resin and then melting and kneading the resulting polymer blend together with the ethylene-base resin. Optical fiber feeding pipes and optical fiber units making use of such resin compositions are also described.

8 Claims, No Drawings

RESIN COMPOSITIONS, PRODUCTION PROCESS THEREOF, AND PRODUCTS USING THE RESIN COMPOSITIONS

This is a divisional application of Ser. No. 08/117,701, filed Sep. 8, 1993, now abandoned.

BACKGROUND OF THE INVENTION

1) Field of the Invention

This invention relates to novel resin compositions having excellent surface lubricity, and more specifically to resin compositions having extremely good surface lubricity and also superb abrasion resistance and mechanical strength. Further, this invention is concerned with a process for the production of the resin compositions and also with products using the resin compositions.

2) Description of the Related Art

Resin composition s having excellent surface lubricity have found utility as mechanical parts such as gears, cams and levers, pipes for transporting materials or articles such as pressurized air carrying optical fiber feeding pipes, and sliding members such as guide rollers.

As a conventional method for improving the surface lubricity of a molded or otherwise formed resin body (hereinafter collectively called the "formed body"), it is known as the simplest method to coat the surface of the formed body with silicone oil as a lubricant.

Such a conventional method is however accompanied by the problem that the silicone oil present on the surface of the formed body is gradually lost through contact with other objects and lubricating effect of the silicone oil does not last over a long period. The conventional method involves the additional problem that the objects so contacted are smeared with the silicone oil.

With a view toward overcoming the problems described above, a process has been proposed to obtain a formed body by using a resin composition with a lubricant component such as silicone oil mixed in a resin.

The formed body obtained from the resin composition, which contains the lubricant component incorporated in the resin, has a certain degree of lubricity. To allow the formed body to exhibit a high degree of lubricity, however, addition of a great deal of silicone oil is needed, leading to problems such that the resulting resin composition shows reduced formability or moldability and can provide only formed bodies of reduced mechanical strength. Even if lubricity can be imparted to a possible maximum degree at the sacrifice of mechanical strength, the lubricity so attained is still not fully satisfactory for the above-described applications.

SUMMARY OF THE INVENTION

There is accordingly a desire for the development of a resin composition which has a high degree of lubricity and excellent mechanical strength in view of the above-described various applications.

To overcome the above-described problems, the present inventors have proceeded with extensive research on the development of lubricity through combinations of lubricant components and resins.

As a result, it has been found that a combination of an ethylene-base resin containing linear low-density polyethylene in a specific amount and a polyorganosiloxane having a particular molecular weight can provide a resin composition capable of furnishing a formed body having not only significantly improved surface lubricity but also excellent abrasion resistance and mechanical strength, leading to the completion of the present invention.

In one aspect of the present invention, there is thus provided a resin composition comprising:
 100 parts by weight of an ethylene-base resin comprising at least 2 wt. % of linear low-density polyethylene; and
 0.1–30 parts by weight of an organopolysiloxane having an average molecular weight of at least 100,000.

In another aspect of the present invention, there is also provided a resin composition comprising:
 100 parts by weight of an ethylene-base resin comprising at least 2 wt. % of linear low-density polyethylene;
 0.1–100 parts by weight of a propylene-base resin; and
 0.1–30 parts by weight, per 100 parts by weight of the sum of the ethylene-base resin and the propylene-base resin, of an organopolysiloxane having an average molecular weight of at least 100,000.

In a further aspect of this invention, there is also provided a process for the production of the former resin composition, which comprises:
 melting and kneading the organopolysiloxane together with the linear low-density polyethylene; and
 melting and kneading the resulting polymer blend together with the ethylene-base resin other than the linear low-density polyethylene in such proportions that the resulting resin composition comprises 100 parts by weight of the ethylene-base resin comprising at least 2 wt. % of the linear low-density polyethylene and 0.1–30 parts by weight of the organopolysiloxane having an average molecular weight of at least 100,000.

In a still further aspect of the present invention, there is also provided a process for the production of the latter resin composition, which comprises:
 melting and kneading the organopolysiloxane together with the propylene-base resin; and
 melting and kneading the resulting polymer blend together with the ethylene-base resin, which comprises at least 2 wt. % of the linear low-density polyethylene, in such proportions that the resulting resin composition comprises 100 parts by weight of the ethylene-base resin comprising at least 2 wt. % of linear low-density polyethylene, 0.1–100 parts by weight of the propylene-base resin and 0.1–30 parts by weight, per 100 parts by weight of the sum of the ethylene-base resin and the propylene-base resin, of the organopolysiloxane.

In a still further aspect of the present invention, there is also provided an optical fiber feeding pipe comprising a layer of the former or latter resin composition formed on at least an inner wall thereof.

In a still further aspect of the present invention, there is also provided an optical fiber unit comprising a layer of the former or latter resin composition formed on at least an outermost layer thereof.

The resin compositions according to the present invention can provide, owing to the addition of the organopolysiloxane in the small amount, formed bodies having not only excellent surface lubricity but also superb abrasion resistance and mechanical strength.

The resin compositions of this invention can therefore be used in a wide variety of applications making use of such properties, for example, mechanical parts such as gears, cams and levers, pipes for transporting materials or articles such as pressurized air carrying optical fiber feeding pipes, coating materials for optical fiber units, and sliding members such as guide rollers.

In particular, optical fiber feeding pipes of the pressurized-air carrying type having a layer of one of the resin compositions according to this invention on at least inner walls thereof are excellent in surface lubricity so that they permit pressurized-air carrying of an optical fiber over a long distance irrespective of the coating material or surface condition of the optical fiber unit to be inserted under pressure and also irrespective of the state of installation of the pipe itself.

In optical fiber units having a coating layer made of one of the resin compositions according to the present invention on at least outermost layers thereof, their surfaces show excellent lubricity so that they can be fed under pressure through feeding pipes over a long distance irrespective of the material or the like of the feeding pipes.

Further, optical fiber feeding pipes and optical fiber units produced using one of the resin compositions according to this invention are excellent in surface lubricity, thereby making it possible, different from the prior art, to insert optical fiber units by the suction method or the push method even in subscribers—loops or buildings where the optical fibers are bent frequently although the distances of insertion are relatively short. It is therefore unnecessary to use special equipment, thereby bringing about the advantageous effect that on-site installation work becomes extremely easy.

DETAILED DESCRIPTION OF THE INVENTION AND PREFERRED EMBODIMENT

The technical features of the present invention will hereinafter be described in detail.

In the present invention, it is important to use, as a resin, an ethylene-base resin containing at least 2 wt. %, especially 5 wt. % or more of linear low-density polyethylene, because the present invention is based on the finding that extremely high lubricity can be exhibited when an organopolysiloxane of an extremely high molecular weight, which is to be described subsequently, is added to an ethylene-base resin.

As a result of research conducted by the present inventors with a view to determining a resin which makes it possible to draw the lubricity of an organo-polysiloxane to a maximum extent when combined with the organopolysiloxane, it was found that an ethylene-base resin is effective as such a resin and also that inclusion of linear low-density polyethylene in a particular amount or more in the ethylene-base resin permits high-degree dispersion of the organopolysiloxane and addition of the organopolysiloxane in a small amount can therefore significantly improve the lubricity without lowering the strength of the resulting formed resin body.

If an ethylene-base resin containing linear low-density polyethylene in an amount smaller than 2 wt. % is used, it is difficult to disperse the high molecular weight organopolysiloxane to a high degree in the resin so that the objects of the present invention cannot be achieved.

No particular limitation is imposed on the proportion of the linear low-density polyethylene in the ethylene-base resin. The ethylene-base resin may therefore be formed entirely of linear low-density polyethylene. To control physical properties, such as hardness and mechanical strength, of the resulting resin composition, however, another ethylene-base resin composed predominantly of ethylene can be contained, as needed, within the range described above.

In the present invention, conventional linear low-density polyethylene resins available by copolymerizing ethylene with α-olefins such as butene-1 can be used as the linear low-density polyethylene without any particular limitation. These linear low-density polyethylene resins generally have a density in a range of from 0.910 to 0.925. Among these, those having an average molecular weight ranging from 10,000 to 200,000 can be suitably used in the present invention.

As the ethylene-base resin, any known ethylene-base resins can be used in the present invention without any particular limitation insofar as they contain the above-described linear low-density polyethylene and are composed predominantly of ethylene having good compatibility with the linear low-density polyethylene. Illustrative ethylene-base resins include homopolymers such as low-density polyethylene and copolymers composed primarily of ethylene. Of these, high-density polyethylene having a high crystallization degree is particularly preferred as it can further enhance the lubricity-improving effect of the resulting resin composition.

In the present invention, preferred examples of the ethylene-base resin are those formed of 2–50 wt. %, preferably 5–30 wt. % of linear low-density polyethylene and the remainder of an ethylene-base resin other than linear low-density polyethylene, especially high-density polyethylene.

To further improve the dispersibility of the organopolysiloxane into the ethylene-base resin and also to improve the lubricity of the resulting resin composition, it is preferred to add a propylene-base resin in an amount of 0.1–100 parts by weight, preferably 0.3–20 parts by weight, more preferably 0.3–10 parts by weight per 100 parts by weight of the ethylene-base resin in the present invention. The propylene-base resin exhibits its effects when added in an amount of 0.1 part by weight or more. Amounts greater than 100 parts by weight however tend to suppress the lubricity-imparting effect derived under the action of the ethylene-base resin and the organopolysiloxane and to reduce the lubricity conversely.

Any known propylene-base resin formed primarily of propylene can be used as the propylene-base resin without any particular limitation.

Usable exemplary propylene-base resins include propylene homopolymer; copolymers such as block copolymers, random copolymers and graft copolymers of propylene and α-olefins other than propylene, such as ethylene and butene-1; and mixtures thereof. Of these copolymers, those containing ethylene units in a range not greater than 30 mole %, more preferably 0.15–15 mole % are particularly preferred.

Illustrative of the organopolysiloxane employed in the present invention include those having an average molecular weight of at least 100,000, preferably those having a high molecular weight of from 300,000 to 5,000,000. If the average molecular weight of an organopolysiloxane is smaller than 100,000, the organopolysiloxane does not have sufficient lubricity-improving effect so that the objects of the present invention cannot be achieved.

Organopolysiloxanes of any known structure can be used without any particular limitation provided that they have the molecular weight specified above.

Usable organopolysiloxanes include, for example, dimethylpolysiloxane, methylphenylpolysiloxane and ethylhydrogenpolysiloxane as well as modified organopolysiloxanes such as those obtained by subjecting the above-mentioned polysiloxanes to modifications such as alkyl modification, amino modification, epoxy modification, mercapto modification, chloroalkyl modification, alcohol modification, polyether modification and fluorine modification.

Incidentally, the organopolysiloxane employed in the present invention can be either linear or branched.

The amount of the organopolysiloxane added in the present invention is 0.1–30 parts by weight, preferably 0.3–20 parts by weight per 100 parts by weight of the ethylene-base resin or the sum of the ethylene-base resin and the propylene-base resin.

Amounts less than 0.1 part by weight are too small to sufficiently improve the lubricity. Amounts greater than 30 parts by weight, on the other hand, cannot bring about additional lubricating effect. Use of the organopolysiloxane in such unduly large amounts are therefore disadvantageous from the economical standpoint and, moreover, tend to reduce physical properties such as mechanical strength.

In the present invention, the organopolysiloxane can be dispersed in a form merely mixed in the ethylene-base resin or in the ethylene-base resin and propylene-base resin or can be partly grafted with the resin.

Needless to say, the resin composition according to the present invention can be added with known additives such as anitoxidants, light stabilizers, antistatic agents, pigments and fillers to an extent not significantly deteriorating the effects of the present invention such as lubricity.

Although no particular limitation is imposed on the process for the production of the resin composition of this invention, it is preferred to adopt such a process that an organopolysiloxane having a high molecular weight of 100,000 or higher in terms of average molecular weight can be dispersed to a high degree in an ethylene-base resin which contains at least 2 wt. % of linear low-density polyethylene.

The resin composition can be produced generally by melting and kneading the organopolysiloxane with the linear low-density polyethylene having relatively good compatibility with the organopolysiloxane and, if necessary, melting and kneading the resulting blend and the remainder of the ethylene-base resin so that the resin composition comprises 100 parts by weight of the ethylene-base resin containing at least 2 wt. % of linear low-density polyethylene and 0.1–30 parts by weight of the organopolysiloxane having an average molecular weight of 100,000 or higher.

Any known method can be adopted without any particular limitation for the above-described melting and kneading. In general, the melting and kneading can be carried out at 160°–300° C., preferably 180°–270° C. by using a mixer such as a screw extruder, a Banbury mixer or mixing rolls.

In the process described above, it is preferred to cause an organic peroxide to exist upon melting and kneading so that the dispersibility of the organopolysiloxane in linear low-density polyethylene can be improved.

No particular limitation is imposed on the organic peroxide employed in the above process as long as it decomposes to produce radicals at the melting and kneading temperature. Examples of such organic peroxides include ketone peroxides such as methyl ethyl ketone peroxide, methyl isobutyl ketone peroxide and cyclohexanone peroxide; diacyl peroxides such as isobutyryl peroxide, lauroyl peroxide and benzoyl peroxide; hydroperoxides such as diisopropylbenzene hydroperoxide; dialkyl peroxides such as dicumyl peroxide, 2,5-dimethyl-2,5-di(t-butylperoxy)hexane, 1,3-bis-(t-butylperoxyisopropyl)benzene, di-t-butyl peroxide, and 2,5-dimethyl-2,5-di-(t-butylperoxy)hexane-3; peroxyketals such as 1,1-di-t-butylperoxy-3,3,5-trimethylcyclohexane and 2,2-di(5-butylperoxy)butane; alkyl peresters such as t-butyl peroxypivarate and t-butyl peroxybenzoate; percarbonates such as t-butyl peroxyisopropyl carbonate.

The organic peroxide can be used in an amount of 0.001–0.1 part by weight per 100 parts by weight of the resin fed upon mixing and kneading.

In the above-described production process of the resin composition of this invention, a propylene-base resin having still better compatibility with the high-molecular organopolysiloxane can be used further. After mixing the resin and the organopolysiloxane in advance, the resulting polymer blend is mixed with the ethylene-base resin, thereby making it possible to obtain a resin composition permitting still improved dispersion of the organopolysiloxane.

Namely, the above-described process comprises melting and kneading the organopolysiloxane having the molecular weight of at least 100,000 together with the propylene-base resin and then melting and kneading the resulting polymer blend together with the ethylene-base resin, which comprises at least 2 wt. % of the linear low-density polyethylene, in such proportions that the resulting resin composition comprises 100 parts by weight of the ethylene-base resin, 0.1–100 parts by weight of the propylene-base resin and 0.1–30 parts by weight, per 100 parts by weight of the sum of the ethylene-base resin and the propylene-base resin, of the organopolysiloxane.

In the above process, a mixer similar to that described above can be used for the melting and kneading. The suitable melting and kneading temperature is 160°–300° C., with 180°–270° C. being preferred.

In the above process, it is preferred to cause a peroxide to exist during the melting and kneading so that the dispersibility of the organopolysiloxane in the propylene-base resin can be improved. No particular limitation is imposed on an organic peroxide employed in the above process as long as it decomposes to produce radicals at the melting and kneading temperature. As such an organic peroxide, any one of the above-exemplified organic peroxides can be selected and used as needed.

After the propylene-base resin and the organopolysiloxane are melted and kneaded, the resulting polymer blend is melted and kneaded with the ethylene-base resin. This melting and kneading can be performed directly together with the ethylene-base resin containing linear low-density polyethylene. In particular, it is however preferred to melt and knead the polymer blend with the linear low-density polyethylene and then to melt and knead the thus-formed blend with the remainder of the ethylene-base resin.

In the above-described production process of the resin composition of this invention, the organopolysiloxanes exemplified above can be used without any limitation. In particular, those containing 0.001–0.3 wt. % of vinyl groups can be used suitably.

As the above-described vinyl-containing organopolysiloxane, it is generally possible to use such an organopolysiloxane as produced by setting production conditions to control the content of vinyl groups at 0.001–0.3 wt. % in the molecule or as produced by replacing each organic group, which is bonded to a silicon atom, with a vinyl group. Organopolysiloxanes usable most suitably in the present invention are those obtained by substituting vinyl groups for methyl groups of dimethylpolysiloxanes having an average molecular weight of 100,000 or more so that vinyl groups are contained within the range specified above.

No particular limitation is imposed on the forming method of the resin composition of this invention. Conventional forming methods such as extrusion and injection molding can therefore be adopted. Of these, extrusion can bring about the advantages of the present invention markedly.

The resin compositions according to the present invention are excellent not only in surface smoothness but also in abrasion resistance and mechanical strength.

Accordingly, the present invention can also provide various products making use of these excellent properties.

The resin compositions according to the present invention are hence useful, for example, as mechanical parts such as gears, cams and levers, sliding members such as guide rollers, and optical-fiber-related products requiring high surface lubricity, more specifically, pressurized air carrying optical fiber feeding pipes and coating materials for optical fiber units.

A detailed description will next be made of the extremely high usefulness of the above resin composition of this invention for optical-fiber-related products among the products making use of the resin composition according to this invention.

As is known well, pressurized air carrying optical fiber feeding pipes are installed in a form assembled beforehand in cables such as power cables or optical fiber cables to meet any future increase in the demand for optical transmission lines. At the time of such an increase in demand, the demand increase can be appropriately coped with by feeding pressurized gas such as air into the optical fiber feeding pipes and inserting cables such as optical fiber units into the optical fiber feeding pipes.

As has been described above, optical transmission lines installed in the air or ground or in a building are provided with a special pipe capable of introducing an optical fiber unit into the cable in advance so that additional optical fibers can be installed to meet a future increase in the volume of transmission or the optical fibers can be replaced by fresh optical fibers as a result of quality improvements in optical fibers.

To insert an optical fiber unit or the like into such a special pipe as described above, a pressurized air carrying method making use of compressed air or the like, which is called the "streaming method", is generally adopted. According to this method, the optical fiber unit or the like to be inserted is fed by rollers or the like and, at the same time, compressed gas is blown into the special pipe so that the optical fiber or the like is allowed to advance while being carried by the gas stream.

In the above-described insertion of the optical fiber unit or the like by the pressurize air carrying method, there is a limitation to the distance of pressure feeding, in other words, the problem that the optical fiber unit or the like cannot be pressure fed over a long distance where the coefficient of friction between the inserted optical fiber and the pipe is high. Further, the distance of pressure feeding varies depending on whether the state of installation of a pipe is straight or curved, leading to the problem that the optical fiber unit or the like may not be pressure fed over a desired distance in some instances.

To overcome such problems, it has heretofore been the practice to employ one or more of the following methods:

(1) A distance of pressure feeding is divided into short sections. Optical fibers are inserted through the respective sections and are then connected.

(2) As a resin composition for pipes, a resin composition added with an amide-base lubricant is used.

(3) To reduce the friction of coefficient, the inner wall of a pipe is coated with a lubricant.

The method (1) however involves a transmission loss due to the connection, leading to the problem that long-distance transmission requires repeaters or amplifiers. According to the method (2), the effect of the amide-base lubricant does not last long. Moreover, the resulting pipe is sensitive to temperature variations and cannot stably provide constant lubricity.

The method (3), on the other hand, is effective in substantially increasing the distance of pressure feeding irrespective of the state of installation, that is, no matter whether the pipe is installed in a linear state or in a curved state. Compared with a pipe not coated with any lubricant, pressure feeding over a distance 2–3 times as much as a general feeding distance namely, up to about 1,000 m is feasible.

The method (3) is however accompanied by the practical problem that coating of the lubricant inside a pipe is difficult where the pipe has a large length. Further, as the optical fiber unit or the like is pressure fed, the lubricant is removed gradually from an inlet having a higher chance of contact and its vicinity area so that the pressure feeding property drops with time. Depending on the kind of the surface-coating material for the optical fiber unit, the coating of the inner wall of the pipe with the lubricant cannot bring about any advantage, leading to the problem that the optical fiber unit or the like cannot be advanced.

The resin compositions according to the present invention can overcome the problems described above. Examples of extremely valuable products making use of the resin compositions according to this invention include pressurized air carrying optical fiber feeding pipes having a layer of one of the resin compositions of this invention on at least inner walls thereof as well as optical fiber units having a layer of one of the resin compositions according to this invention on at least outermost layers thereof. This will be substantiated in Examples to be described subsequently.

In the present invention, the above feeding pipes can each be formed with a desired cross-sectional shape from one of the resin compositions of this invention by a forming process such as extrusion. On the other hand, the above optical fiber units can each be produced by forming a coating layer of one of the resin compositions of this invention on a core by extrusion coating or the like. The coating layer generally has a thickness in a range of from 0.2 mm to 5 mm.

The present invention will hereinafter be described specifically in the following Examples. It is to be noted that the present invention is not limited to these Examples.

In the Examples and Comparative Examples, various tests were carried out by the following methods.

(1) Abrasion resistance and lubricity

In each of the Examples and Comparative Examples, a resin composition produced therein was extruded into a hollow cylindrical body of 25.6 mm in outer diameter and 20.00 mm in inner diameter by an extruder. The hollow cylindrical body was cut in lengths of 15.0 mm each to provide test pieces. An abrasion test was conducted using a Suzuki abrasion tester. Using as a counterpart material a material of the same material as each test piece, the abrasion test was conducted under the following testing conditions—testing speed: 500 mm/sec, testing load: 500 gf, and testing distance: 3 km. A weight change of the test piece before and after the test was determined. The abrasion resistance of the test piece was evaluated using the weight loss as an abrasion wear. At the same time, the coefficient of friction of each test piece was measured to evaluate its lubricity.

(3) Tensile strength at yield point

The tensile strength at yield point of each of the produced resin compositions was measured in accordance with the procedures specified under JIS K7113.

Examples 1–8 and Comparative Examples 1–5

In each of the Examples and Comparative Examples, "NEOZEX-2015M" (trade name; product of Mitsui Petrochemical Industries, Ltd.), which is linear low-density polyethylene having an average molecular weight of 100,000 (hereinafter abbreviated as "LLDPE"), and an organopolysiloxane (hereinafter abbreviated as "OP—Si") were mixed in the respective proportions shown in Table 1 in a Henschel mixer, followed by melting and kneading at 220° C. In the table, "OP—Si (a)" indicates an organopolysiloxane having an average molecular weight of 450,000 and a vinyl group content of 0.004 wt. %, "OP—Si (b)" an organopolysiloxane having an average molecular weight of 350,000 and a vinyl group content of 0.003 wt. %, and "OP—Si (c)" an organopolysiloxane having an average molecular weight of 50,000 and a vinyl group content of 0.01 wt. %.

Incidentally, the term "average molecular weight" as used herein means a weight average molecular weight irrespective of the resin unless otherwise specifically indicated.

The resulting polymer blend and "HIGHZEX" (trade mark; product of Mitsui Petrochemical Industries, Ltd.), which is high-density polyethylene having an average molecular weight of 150,000 (hereinafter abbreviated as "HDPE"), were then melted and kneaded at 220° C., so that an ethylene-base resin containing the linear low-density polyethylene (LLDPE) and the high-density polyethylene (HDPE) in the respective proportions (wt. %) shown in Table 1 was formed and the organopolysiloxane (OP—Si) was contained in the proportion (parts by weight) shown in Table 1 per 100 parts by weight of the ethylene-base resin.

With respect to the resin composition so produced, the lubricity, abrasion resistance and tensile strength at yield point were measured. The results are also presented in Table 1.

From Table 1, the following advantages of the present invention can be envisaged:

(i) As is substantiated through a comparison between Examples 1–4 and Comparative Examples 1–3, addition of an organopolysiloxane having a high molecular weight in a proportion outside a specific range is unable to obtain a resin composition excellent in balance among various physical properties such as coefficient of friction, abrasion wear and tensile strength at yield point.

(ii) As is substantiated through a comparison between Example 5 and Comparative Example 4, an organopolysiloxane cannot contribute to an improvement especially in lubricity unless it has a high molecular weight in a particular range.

(iii) As is substantiated, for example, through a comparison between Comparative Example 5 and Example 1, advantages available from the use of low-density polyethylene are exhibited as extremely high lubricity and abrasion resistance.

The above-described differences in effects may be attributable primarily to the possibility that, in each resin composition according to the present invention, the added organopolysiloxane of the high molecular weight is dispersed uniformly as very small particles in the high-density polyethylene under the action of the linear low-density polyethylene whereas, in the resin composition of Comparative Example 5, the organopolysiloxane is not fully dispersed in the high-density polyethylene and is contained as coarse particles of a considerable size there.

Examples 9–13

Resin compositions were obtained as in Examples 1, 5, 6, 7 and 8, respectively, except that, upon melting and kneading the linear low-density polyethylene (LLDPE) and the organopolysiloxane (OP—Si), an organic peroxide [1,3-bis-(t-butylperoxyisopropyl)benzene] was caused to present in an amount of 0.004 part by weight per 100 parts by weight of the linear low-density polyethylene (LLDPE).

TABLE 1

| Example or Comp. Ex. No. | LLDPE (wt. %) | HDPE (wt. %) | PP (wt. parts) | OP-Si (a)/(b)/(c) | OP-Si wt. parts | Coefficient of friction | Abrasion wear (mg) | Tensile strength at yield point (kg/cm$^2$) |
|---|---|---|---|---|---|---|---|---|
| Example |  |  |  |  |  |  |  |  |
| 1 | 10 | 90 | — | (a) | 0.5 | 0.14 | 0.3 | 210 |
| 2 | 10 | 90 | — | (a) | 2.5 | 0.09 | 0.2 | 200 |
| 3 | 10 | 90 | — | (a) | 7.2 | 0.08 | 0.1 | 190 |
| 4 | 10 | 90 | — | (a) | 15.3 | 0.05 | 0.1 | 170 |
| Comp. Ex. |  |  |  |  |  |  |  |  |
| 1 | 10 | 90 | — | (a) | 0.05 | 0.48 | 0.9 | 210 |
| 2 | 10 | 90 | — | — | — | 0.55 | 1.2 | 220 |
| 3 | 10 | 90 | — | (a) | 35.0 | 0.05 | 0.1 | 90 |
| Example |  |  |  |  |  |  |  |  |
| 5 | 10 | 90 | — | (b) | 0.5 | 0.15 | 0.4 | 210 |
| Comp. Ex. |  |  |  |  |  |  |  |  |
| 4 | 10 | 90 | — | (c) | 0.5 | 0.52 | 0.8 | 160 |
| Example |  |  |  |  |  |  |  |  |
| 6 | 50 | 50 | — | (a) | 0.5 | 0.10 | 0.1 | 160 |
| 7 | 100 | 0 | — | (a) | 0.5 | 0.10 | 0.1 | 110 |
| 8 | 6 | 94 | — | (a) | 0.5 | 0.16 | 0.3 | 220 |
| Comp. Ex. |  |  |  |  |  |  |  |  |
| 5 | 0 | 100 | — | (a) | 0.5 | 0.35 | 0.8 | 220 |

With respect to the resin compositions so produced, the lubricity, abrasion resistance and tensile strength at yield point were measured. The results are also presented in Table 2.

TABLE 2

| Example No. | LLDPE (wt. %) | HDPE (wt. %) | PP (wt. parts) | OP-Si (a)/(b) | OP-Si wt. parts | Coefficient of friction | Abrasion wear (mg) | Tensile strength at yield point (kg/cm$^2$) |
|---|---|---|---|---|---|---|---|---|
| 9  | 10  | 90 | — | (a) | 0.5 | 0.09 | 0.1 | 190 |
| 10 | 10  | 90 | — | (b) | 0.5 | 0.10 | 0.2 | 190 |
| 11 | 50  | 50 | — | (a) | 0.5 | 0.09 | 0.1 | 160 |
| 12 | 100 | 0  | — | (a) | 0.5 | 0.09 | 0.1 | 110 |
| 13 | 6   | 94 | — | (a) | 0.5 | 0.10 | 0.1 | 220 |

Examples 14–21

In each Example, "TOKUYAMA POLYPRO MJ160" (trade name; product of Tokuyama Soda Co., Ltd; hereinafter abbreviated as "PP".) was used as a propylene-base resin. PP and the organopolysiloxane (OP—Si) shown in Table 3 were mixed in a Henschel mixer, followed by melting and kneading at 220° C.

The resulting polymer blend as well as the linear low-density polyethylene (LLDPE) and the high-density polyethylene (HDPE), both used in Example 1, were then melted and kneaded at 220° C., so that an ethylene-base resin containing the linear low-density polyethylene (LLDPE) and the high-density polyethylene (HDPE) in the respective proportions (wt. %) shown in Table 3 was formed, the polypropylene (PP) was contained in the proportion (parts by weight) shown in Table 3 per 100 parts by weight of the ethylene-base resin, and the organopolysiloxane (OP—Si) was contained in the proportion (parts by weight) shown in Table 1 per 100 parts by weight of the sum of the ethylene-base resin and the polypropylene (PP).

With respect to the resin composition so produced, the lubricity, abrasion resistance and tensile strength at yield point were measured. The results are also presented in Table 3.

TABLE 3

| Example No. | LLDPE (wt. %) | HDPE (wt. %) | PP (wt. parts) | OP-Si (a)/(b) | OP-Si wt. parts | Coefficient of friction | Abrasion wear (mg) | Tensile strength at yield point (kg/cm$^2$) |
|---|---|---|---|---|---|---|---|---|
| 14 | 10  | 90 | 0.5  | (a) | 0.5 | 0.12 | 0.3 | 220 |
| 15 | 10  | 90 | 5.0  | (a) | 0.5 | 0.12 | 0.3 | 230 |
| 16 | 10  | 90 | 15.0 | (a) | 0.5 | 0.12 | 0.3 | 240 |
| 17 | 10  | 90 | 50.0 | (a) | 0.5 | 0.15 | 0.4 | 300 |
| 18 | 10  | 90 | 0.5  | (b) | 0.5 | 0.12 | 0.3 | 220 |
| 19 | 50  | 50 | 0.5  | (a) | 0.5 | 0.10 | 0.1 | 200 |
| 20 | 100 | 0  | 0.5  | (a) | 0.5 | 0.10 | 0.1 | 160 |
| 21 | 6   | 94 | 0.5  | (a) | 0.5 | 0.16 | 0.3 | 220 |

Examples 22–28

Resin compositions were obtained as in Examples 14, 15, 16, 18 and 21, respectively, except that, upon melting and kneading the polypropylene (PP) and the organopolysiloxane (OP—Si), an organic peroxide [1,3-bis-(t-butylperoxyisopropyl)benzene] was caused to present in an amount of 0.004 part by weight per 100 parts by weight of the polypropylene (PP).

With respect to the resin compositions so produced, the lubricity, abrasion resistance and tensile strength at yield point were measured. The results are also presented in Table 4.

TABLE 4

| Example No. | LLDPE (wt. %) | HDPE (wt. %) | PP (wt. parts) | OP-Si (a)/(b) | OP-Si wt. parts | Coefficient of friction | Abrasion wear (mg) | Tensile strength at yield point (kg/cm$^2$) |
|---|---|---|---|---|---|---|---|---|
| 22 | 10 | 90 | 0.5 | (a) | 0.5 | 0.10 | 0.1 | 210 |
| 23 | 10 | 90 | 0.5 | (a) | 1.0 | 0.09 | 0.1 | 210 |
| 24 | 10 | 90 | 0.5 | (a) | 5.0 | 0.08 | 0.1 | 190 |
| 25 | 10 | 90 | 5.0 | (a) | 0.5 | 0.10 | 0.1 | 210 |
| 26 | 10 | 90 | 15.0 | (a) | 0.5 | 0.10 | 0.1 | 230 |
| 27 | 10 | 90 | 0.5 | (b) | 0.5 | 0.10 | 0.1 | 210 |
| 28 | 6 | 94 | 0.5 | (a) | 0.5 | 0.10 | 0.1 | 210 |

Examples 29–36 and Comparative Examples 6–9

As products making use of resin compositions according to the present invention, optical fiber feeding pipes were produced. In each of the Examples and Comparative Examples, the resin composition shown in Table 5 was produced. After the resin composition was kneaded in an extruder, it was extruded into an optical fiber feeding pipe having an inner diameter of 6 mm and an outer diameter of 8 mm. In Table 5, the organopolysiloxane (OP—Si) is the same as the organopolysiloxane employed in Example 1, that is, the organopolysiloxane having the average molecular weight of 450,000 and the vinyl group content of 0.004 wt. % [i.e., OP—Si (a)]. The other components, LLDPE, HDPE and PP are as specified above.

In Table 5, Comparative Example 7, HDPE was added with 0.1 wt. % of oleic azide (lubricant) in place of OP—Si. Comparative Example 8 is directed to a HDPE pipe whose inner wall was coated with oleic azide (lubricant).

Various properties of the optical fiber feeding pipes so produced are also shown in Table 5. The properties set out in Table 5 were determined as will be described below.
(1) Coefficient of friction:

Each feeding pipe was wound three times around a drum having a diameter of 60 cm. An optical fiber unit having an inner diameter of 2 mm and coated with foamed polyethylene was inserted into the pipe. While applying a back tension of 40 g to the leading end of the optical fiber, the optical fiber was pulled out. The coefficient of friction of the feeding pipe was calculated from the tensile force required upon pulling out the optical fiber.
(2) Pressure feed performance:

Pressurized dry air was blown at 6 kg/cm$^2$ into each feeding pipe of 1,000 m in length. The pressure feed performance of the feeding pipe was evaluated in term of the time (minutes) required to pressure feed an optical fiber unit forward through the feeding pipe. In Table 6, (1) indicates pressure feed performance under linear conditions while (2) designates pressure feed performance when the feeding pipe was wound around a drum having a diameter of 1 m.
(3) Impact resistance:

A 1-kg weight having a striking face of 25 mm in diameter was caused to drop onto each feeding pipe at 25° C. from a height of 0.5 m. The impact resistance of the feeding pipe was evaluated in accordance with the following evaluation standard:

Good . . . No damage.

Fair . . . Some cracks occurred but posed no problem or inconvenience in practice.

Poor . . . Cracks propagated to the inner wall of the pipe so that pressurized carrying air leaked through the cracks. The pipe was no longer usable.

(4) Formability:

Each resin composition was extruded at a resin temperature of 170°–190° C. into a hollow cylindrical shape of 8 mm in outer diameter and 6 mm in inner diameter. The formability of the resin composition was evaluated in accordance with the following evaluation standard.

Excellent . . . Pipes of 10,000 m or longer were successfully extruded without problem.

Good . . . Pipes of at least 5,000 m but not longer than 10,000 m were successfully extruded.

Fair . . . Pipes of at least 2,000 m but not longer than 5,000 m were successfully extruded.

Poor . . . Pipes of 1,000 m or shorter were only extruded.

TABLE 5

| | LLDPE (wt. %) | HDPE (wt. %) | PP (wt. parts) | OP-Si (wt. parts) | Coefficient of friction (μ) | Pressure feed performance (1) | Pressure feed performance (2) | Impact resistance | Formability |
|---|---|---|---|---|---|---|---|---|---|
| Example 29 | 10.0 | 90.0 | — | 0.50 | 0.08 | 42 min | 51 min | Good | Excellent |
| Example 30 | 10.1 | 89.9 | — | 1.01 | 0.07 | 25 min | 33 min | Good | Excellent |
| Example 31 | 10.2 | 89.8 | — | 2.04 | 0.05 | 25 min or less | 30 min or less | Good | Excellent |
| Example 32 | 10.5 | 89.5 | — | 5.26 | 0.05 | 25 min or less | 30 min or less | Good | Good |
| Example 33 | 11.1 | 88.9 | — | 11.11 | 0.05 | 25 min or less | 30 min or less | Good | Good |
| Example 34 | 11.8 | 88.2 | — | 17.65 | 0.05 | 25 min or less | 30 min or less | Good | Fair |
| Example 35 | 100 | — | — | 1.01 | 0.07 | 25 min | 33 min | Fair | Fair |
| Example 36 | 10.2 | 89.8 | 0.51 | 1.02 | 0.05 | 25 min or less | 33 min or less | Good | Excellent |
| Comp. Ex. 6 | — | 100 | — | — | 0.2 | Stopped at 100–200 m | Stopped at 100 m or less | Good | Excellent |

TABLE 5-continued

|  | LLDPE (wt. %) | HDPE (wt. %) | PP (wt. parts) | OP-Si (wt. parts) | Coefficient of friction (μ) | Pressure feed performance (1) | Pressure feed performance (2) | Impact resistance | Formability |
|---|---|---|---|---|---|---|---|---|---|
| Comp. Ex. 7 | — | *100 | — | — | 0.15 | 60 min or more | Stopped at 800 m or less | Good | Excellent |
| Comp. Ex. 8 | — | 100 | — | — | 0.15 | 750 min or less | Stopped at 500 m or less | Good | Excellent |
| Comp. Ex. 9 | — | 100 | — | 1.01 | 0.07 | — | — | Poor | Poor |

*Lubricant (0.1 wt. %) was contained.

We claim:

1. An optical fiber feeding pipe comprising a resin composition formed on at least an inner wall thereof, said resin composition having excellent surface lubricity, mechanical strength and abrasion resistance, and being useful in mechanical parts where good lubricity is required, consisting essentially of a mixture of:
    100 parts by weight of an ethylene-base resin comprising at least 2 wt. % of linear low-density polyethylene; and
    0.1–30 parts by weight of an organopolysiloxane having a weight average molecular weight of at least 300,000.

2. An optical fiber unit comprising a layer of a resin composition formed on at least an outermost layer thereof, said resin composition having excellent surface lubricity, mechanical strength and abrasion resistance, and being useful in mechanical parts where good lubricity is required, consisting essentially of a mixture of:
    100 parts by weight of an ethylene-base resin comprising of least 2 wt. % of linear low-density polyethylene; and
    0.1–30 parts by weight of an organopolysiloxane having a weight average molecular weight of at least 300,000.

3. An optical fiber feeding pipe comprising a resin composition formed on at least an inner wall thereof, said resin composition having excellent surface lubricity, mechanical strength and abrasion resistance, and being useful in mechanical parts where good lubricity is required, consisting essentially of a mixture of:
    100 parts by weight of an ethylene-base resin comprising at least 2 wt. % of linear low-density polyethylene;
    0.1–100 parts by weight of a propylene-base resin; and
    0.1–30 parts by weight, per 100 parts by weight of the sum of the ethylene-base resin and the propylene-based resin, of an organopolysiloxane having a weight average molecular weight of at least 300,000.

4. An optical fiber unit comprising a layer of a resin composition formed on at least an outermost layer thereof, said resin composition having excellent surface lubricity, mechanical strength and abrasion resistance, and being useful in mechanical parts where good lubricity is required, consisting essentially of a mixture of:
    100 parts by weight of an ethylene-base resin comprising at least 2 wt. % of linear low-density polyethylene;
    0.1–100 parts by weight of a propylene-base resin; and
    0.1–30 parts by weight, per 100 parts by weight of the sum of the ethylene-base resin and the propylene-based resin, of an organopolysiloxane having a weight average molecular weight of at least 300,000.

5. An optical resin fiber feeding pipe according to claim 1, wherein the content of vinyl groups in the organopolysiloxane is in a range of 0.001–0.3 wt. %.

6. An optical fiber unit according to claim 2, wherein the content of vinyl groups in the organopolysiloxane is in a range of 0.001–0.3 wt. %.

7. An optical fiber feeding pipe according to claim 3, wherein the content of vinyl groups in the organopolysiloxane is in a range of 0.001–0.3 wt. %.

8. An optical fiber unit according to claim 4, wherein the content of vinyl groups in the organopolysiloxane is in a range of 0.001–0.3 wt. %.

* * * * *